(12) United States Patent
Lightner et al.

(10) Patent No.: US 9,659,108 B2
(45) Date of Patent: *May 23, 2017

(54) PLUGGABLE ARCHITECTURE FOR EMBEDDING ANALYTICS IN CLUSTERED IN-MEMORY DATABASES

(71) Applicant: QBASE, LLC, Reston, VA (US)

(72) Inventors: Scott Lightner, Leesburg, VA (US); Franz Weckesser, Spring Valley, OH (US)

(73) Assignee: QBase, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,055

(22) Filed: Dec. 2, 2014

(65) Prior Publication Data

US 2015/0154283 A1 Jun. 4, 2015

Related U.S. Application Data

(60) Provisional application No. 61/910,864, filed on Dec. 2, 2013.

(51) Int. Cl.
*G06F 17/30* (2006.01)
*G06F 11/34* (2006.01)

(52) U.S. Cl.
CPC .... *G06F 17/30964* (2013.01); *G06F 11/3409* (2013.01)

(58) Field of Classification Search
CPC .............. G06F 17/3056; G06F 17/30634
See application file for complete search history.

(56) References Cited

U.S. PATENT DOCUMENTS

| 6,128,660 A | 10/2000 | Grimm et al. |
| 6,178,529 B1 | 1/2001 | Short et al. |
| 6,226,635 B1 | 5/2001 | Katariya |
| 6,266,781 B1 | 7/2001 | Chung et al. |

(Continued)

FOREIGN PATENT DOCUMENTS

WO 2013/003770 A2 1/2013

OTHER PUBLICATIONS

International Search Report and Written Opinion dated Mar. 3, 2015, corresponding to International Patent Application No. PCT/US2014/067921, 10 pages.

(Continued)

*Primary Examiner* — Scott A Waldron
(74) *Attorney, Agent, or Firm* — Eric L. Sophir; Dentons US LLP (57) ABSTRACT

Disclosed are pluggable, distributed computing-system architectures allowing for embedding analytics to be added or removed from nodes of a system hosting an in-memory database. The disclosed system includes an API that may be used to create customized, application specific analytics modules. The newly created analytics modules may be easily plugged into the in-memory database. Each user query submitted to the in-memory database may specify different analytics be applied with differing parameters. All analytics modules operate on the in-memory image of the data, inside the in-memory database platform. All the analytics modules, may be capable of performing on-the-fly analytics, which may allow a dynamic and comprehensive processing of search results.

14 Claims, 2 Drawing Sheets

(56) References Cited

U.S. PATENT DOCUMENTS

| | | |
|---|---|---|
| 6,353,926 B1 | 3/2002 | Parthesarathy et al. |
| 6,457,026 B1 | 9/2002 | Graham et al. |
| 6,738,759 B1 | 5/2004 | Wheeler et al. |
| 6,832,373 B2 | 12/2004 | O'Neill |
| 6,832,737 B2 | 12/2004 | Karlsson et al. |
| 7,058,846 B1 | 6/2006 | Kelkar et al. |
| 7,099,898 B1 | 8/2006 | Nakamura et al. |
| 7,370,323 B2 | 5/2008 | Marinelli et al. |
| 7,421,478 B1 | 9/2008 | Muchow |
| 7,447,940 B2 | 11/2008 | Peddada |
| 7,543,174 B1 | 6/2009 | Van Rietschote et al. |
| 7,681,075 B2 | 3/2010 | Havemose et al. |
| 7,818,615 B2 | 10/2010 | Krajewski et al. |
| 7,899,871 B1 | 3/2011 | Kumar et al. |
| 7,984,043 B1 | 7/2011 | Waas |
| 8,055,933 B2 | 11/2011 | Jaehde et al. |
| 8,090,717 B1 | 1/2012 | Bharat et al. |
| 8,122,026 B1 | 2/2012 | Laroco et al. |
| 8,122,047 B2 | 2/2012 | Kanigsberg et al. |
| 8,332,258 B1 | 12/2012 | Shaw |
| 8,341,622 B1 | 12/2012 | Eatough |
| 8,345,998 B2 | 1/2013 | Malik et al. |
| 8,356,036 B2 | 1/2013 | Bechtel et al. |
| 8,375,073 B1 | 2/2013 | Jain |
| 8,423,522 B2 | 4/2013 | Lang et al. |
| 8,429,256 B2 | 4/2013 | Vidal et al. |
| 8,645,298 B2 | 2/2014 | Hennig et al. |
| 8,726,267 B2 | 5/2014 | Li et al. |
| 8,782,018 B2 | 7/2014 | Shim et al. |
| 8,972,396 B1 | 3/2015 | Zhang et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 9,087,005 B2 | 7/2015 | Chen et al. |
| 9,201,744 B2 | 12/2015 | Lightner et al. |
| 2001/0037398 A1 | 11/2001 | Chao et al. |
| 2002/0031260 A1 | 3/2002 | Thawonmas et al. |
| 2002/0052730 A1 | 5/2002 | Nakao |
| 2002/0099700 A1 | 7/2002 | Li |
| 2002/0165847 A1 | 11/2002 | McCartney et al. |
| 2002/0174138 A1 | 11/2002 | Nakamura et al. |
| 2003/0028869 A1 | 2/2003 | Drake et al. |
| 2003/0112792 A1 | 6/2003 | Cranor et al. |
| 2003/0158839 A1 | 8/2003 | Faybishenko et al. |
| 2003/0182282 A1 | 9/2003 | Ripley |
| 2004/0010502 A1 | 1/2004 | Bomfim et al. |
| 2004/0027349 A1 | 2/2004 | Landau et al. |
| 2004/0049478 A1 | 3/2004 | Jasper et al. |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2004/0243645 A1 | 12/2004 | Broder et al. |
| 2005/0091211 A1 | 4/2005 | Vernau et al. |
| 2005/0192994 A1 | 9/2005 | Caldwell et al. |
| 2005/0203888 A1 | 9/2005 | Woosley et al. |
| 2006/0101081 A1 | 5/2006 | Lin et al. |
| 2006/0122978 A1 | 6/2006 | Brill et al. |
| 2006/0294071 A1 | 12/2006 | Weare et al. |
| 2007/0005639 A1 | 1/2007 | Gaussier et al. |
| 2007/0005654 A1 | 1/2007 | Schachar et al. |
| 2007/0027845 A1 | 2/2007 | Dettinger et al. |
| 2007/0073708 A1 | 3/2007 | Smith et al. |
| 2007/0100806 A1 | 5/2007 | Ramer et al. |
| 2007/0156748 A1 | 7/2007 | Emam et al. |
| 2007/0174167 A1 | 7/2007 | Natella et al. |
| 2007/0174289 A1 | 7/2007 | Utiger |
| 2007/0203693 A1 | 8/2007 | Estes |
| 2007/0203924 A1 | 8/2007 | Guha et al. |
| 2007/0240152 A1 | 10/2007 | Li et al. |
| 2007/0250501 A1 | 10/2007 | Grubb et al. |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027920 A1 | 1/2008 | Schipunov et al. |
| 2008/0077570 A1 | 3/2008 | Tang et al. |
| 2008/0109399 A1 | 5/2008 | Liao et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0144609 A1 | 6/2009 | Liang et al. |
| 2009/0216734 A1 | 8/2009 | Aghajanyan et al. |
| 2009/0222395 A1 | 9/2009 | Light et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0100437 A1 | 4/2010 | Dean et al. |
| 2010/0138931 A1 | 6/2010 | Thorley et al. |
| 2010/0161566 A1 | 6/2010 | Adair et al. |
| 2010/0223264 A1 | 9/2010 | Bruckner et al. |
| 2010/0235311 A1 | 9/2010 | Cao et al. |
| 2010/0274785 A1 | 10/2010 | Procopiuc et al. |
| 2011/0047167 A1 | 2/2011 | Caceres |
| 2011/0071975 A1 | 3/2011 | Friedlander et al. |
| 2011/0093471 A1 | 4/2011 | Brockway et al. |
| 2011/0099163 A1 | 4/2011 | Harris et al. |
| 2011/0119243 A1 | 5/2011 | Diamond et al. |
| 2011/0125764 A1 | 5/2011 | Carmel et al. |
| 2011/0161333 A1 | 6/2011 | Langseth et al. |
| 2011/0264679 A1 | 10/2011 | Dettinger et al. |
| 2011/0282888 A1 | 11/2011 | Koperski et al. |
| 2011/0296390 A1 | 12/2011 | Vidal et al. |
| 2011/0296397 A1 | 12/2011 | Vidal et al. |
| 2012/0016875 A1 | 1/2012 | Jin et al. |
| 2012/0016877 A1 | 1/2012 | Vadrevu et al. |
| 2012/0030220 A1 | 2/2012 | Edwards et al. |
| 2012/0059839 A1* | 3/2012 | Andrade et al. ............. 707/760 |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0143911 A1 | 6/2012 | Liebald et al. |
| 2012/0246154 A1 | 9/2012 | Duan et al. |
| 2012/0254224 A1 | 10/2012 | Thompson |
| 2012/0310934 A1 | 12/2012 | Peh et al. |
| 2012/0323839 A1 | 12/2012 | Kiciman et al. |
| 2013/0036076 A1 | 2/2013 | Yang et al. |
| 2013/0132405 A1 | 5/2013 | Bestgen et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2013/0325660 A1 | 12/2013 | Callaway |
| 2013/0326325 A1 | 12/2013 | De et al. |
| 2014/0013233 A1 | 1/2014 | Ahlberg et al. |
| 2014/0022100 A1 | 1/2014 | Fallon et al. |
| 2014/0046921 A1 | 2/2014 | Bau |
| 2014/0074784 A1 | 3/2014 | Mao et al. |
| 2014/0089237 A1 | 3/2014 | Adibi |
| 2014/0149446 A1 | 5/2014 | Kuchmann-Beauger et al. |
| 2014/0156634 A1 | 6/2014 | Buchmann et al. |
| 2014/0229476 A1 | 8/2014 | Fouad et al. |
| 2014/0244550 A1 | 8/2014 | Jin et al. |
| 2014/0255003 A1 | 9/2014 | Abramson et al. |
| 2014/0280183 A1 | 9/2014 | Brown et al. |
| 2014/0344288 A1 | 11/2014 | Evans et al. |
| 2014/0351233 A1* | 11/2014 | Crupi et al. ............... 707/706 |
| 2015/0074037 A1* | 3/2015 | Sarferaz ................ 707/602 |
| 2015/0149481 A1 | 5/2015 | Lee et al. |
| 2015/0154079 A1 | 6/2015 | Lightner et al. |
| 2015/0154200 A1 | 6/2015 | Lightner et al. |
| 2015/0154264 A1 | 6/2015 | Lightner et al. |
| 2015/0154283 A1 | 6/2015 | Lightner et al. |
| 2015/0154286 A1 | 6/2015 | Lightner et al. |
| 2015/0154297 A1 | 6/2015 | Lightner et al. |

(56) References Cited

U.S. PATENT DOCUMENTS

OTHER PUBLICATIONS

International Search Report and Written Opinion dated Mar. 6, 2015 corresponding to International Patent Application No. PCT/US2014/067993, 9 pages.
International Search Report and Written Opinion dated Mar. 10, 2015 corresponding to International Patent Application No. PCT/US2014/067999, 10 pages.
International Search Report and Written Opinion of the International Searching Authority dated Apr. 15, 2015 corresponding to International Patent Application No. PCT/US2014/068002, 10 pages.
International Search Report and Written Opinion dated Feb. 24, 2015 corresponding to International Patent Application No. PCT/US2014/0067918, 10 pages.
Tunkelang, D. "Faceted Search," Morgan & Claypool Publ., 2009, pp. i-79.
Schuth, A., et al., "University of Amsterdam Data Centric Ad Hoc Faceted Search Runs," ISLA, 2012, pp. 155-160.
Tools, Search Query Suggestions using ElasticSearch via Shingle Filter and Facets, Nov. 2012, pp. 1-12.
Wang, et al., "Automatic Online News Issue Construction in Web Environment," WWW 2008/Refereed Track: Search—Applications, Apr. 21-25, 2008—Beijing, China, pp. 457-466.
Blei et al., "Latent Dirichlet Allocation" Journal of Machine Learning Research 3 (2003), pp. 993-1022.
Chuang et al., "A Practical Web-based Approach to Generating Topic Hierarchy for Text Segments," CIKM '04, Nov. 8-13, 2004, Washington, DC, USA, Copyright 2004 ACM 1-58113-874-0/04/0011, pp. 127-136.
International Search Report and Written Opinion of the International Searching Authority dated Apr. 15, 2015, corresponding to International Patent Application No. PCT/2014/067994, 9 pages.
Vizard, The Rise of In-Memory Databases, Jul. 13, 2012, 3 pages.
Bouchenak, S., "Architecture-Based Autonomous Repair Management: An Application to J2EE Clusters", Proceedings of the 24th IEEE Symposium on Reliable Distributed Systems [online], 2005 [retrieved Dec. 16, 2015], Retrieved from Internet: <URL: http://ieeexplore.ieee.org/stamp/stamp.jsp?tp=&arnumber=1541181>, pp. 1-12.

\* cited by examiner

PLUGGABLE ARCHITECTURE FOR EMBEDDING ANALYTICS IN CLUSTERED IN-MEMORY DATABASES

CROSS-REFERENCE TO RELATED APPLICATIONS

This non-provisional patent application claims the benefit of U.S. Provisional Application No. 61/910,864, entitled "Pluggable Architecture For Embedding Analytics In Clustered In-Memory Databases," filed Dec. 2, 2013, which is hereby incorporated by reference in its entirety.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/557,807, entitled "Method for Facet Searching and Search Suggestions," filed Dec. 2, 2014; U.S. patent application Ser. No. 14/558,254, entitled "Design and Implementation of Clustered In-Memory Database," filed Dec. 2, 2014; U.S. patent application Ser. No. 14/557,827, entitled "Real-Time Distributed In Memory Search Architecture," filed Dec. 2, 2014; U.S. patent application Ser. No. 14/557,951, entitled "Fault Tolerant Architecture for Distributed Computing Systems," filed Dec. 2, 2014; U.S. patent application Ser. No. 14/558,009, entitled "Dependency Manager for Databases," filed Dec. 2, 2014; U.S. patent application Ser. No. 14/558,101 "Non-Exclusionary Search Within In-Memory Databases," filed Dec. 2, 2014; and U.S. patent application Ser. No. 14/557,900, entitled "Data record compression with progressive and/or selective decomposition," filed Dec. 2, 2014; each of which are incorporated herein by reference in their entirety.

FIELD OF THE DISCLOSURE

The present disclosure relates in general to in-memory databases, and more specifically to pluggable in-memory analytic modules.

BACKGROUND

Traditional databases allow users to find pieces of information that are relevant to an entity, and while millions or billions of records may describe that entity the records are generally not linked together without formal foreign key relationships. Large collections of records exist with informal, unreliable or non-existent foreign key relationships. This makes it extremely challenging to bring together all of the records relevant to a single entity.

The traditional approach is to pre-link all of the data within such a collection such that finding one record will lead you directly to the collection of records. This traditional approach has two distinct problems.

First, pre-linking a large collection of records is an intensive process taking considerable time. This imposes a significant lag on the time it can take to integrate new records into the linked collection adversely effecting the timeliness of the data in that collection.

Second, pre-linking the data by definition is restricted to the model used to perform that pre-linking, drastically reducing the ability of a user of the system to vary the parameters of how strongly or weakly records are linked. Pre-linking is also limited to the data available at the time of the pre-linking step.

Another approach is to avoid any pre-linking of the data, but rather to link in real time, or "link-on-the-fly," in response to a user query. This approach allows new records to immediately participate in the collection avoiding any issues of timeliness. It also allows a wide variety of models to be applied to perform the linking using varying algorithms and parameters in the linking process. The traditional disadvantage to this approach has been the ability to run that data intensive query and achieve acceptable interactive response times. This can be overcome be placing the collection in an in-memory database with embedded analytics.

There is therefore a need in the art for flexible database architecture capable of supporting multiple customized analytics modules, designed to process data in real time without having to change how the data is managed, prepared and stored within the system.

SUMMARY

Disclosed herein is a distributed-computing system architecture hosting an in-memory database, which may include any suitable combination of modules and clusters, including one or more of a system interface, a search manager, an analytics agent, a search conductor, a partitioner, a collection, a supervisor, a dependency manager, or any suitable combination. Embodiments of the system may have a pluggable architecture of nodes and software modules, which may facilitate installing, embedding, or otherwise including additional components (e.g., nodes, modules, database instances) on-the-fly (i.e., without interrupting or otherwise disrupting status quo operation of the system). Embodiments of the system may accept later-developed or external, third-party custom analytics modules for inclusion to the in-memory database. Database queries may specify which analytics modules and parameters are to be applied on-the-fly to intermediate query results, without having to first retrieve data out of the database. Systems and methods described herein enable custom tailor analytics modules to be developed independently from the in-memory database, and can also be deployed within the system hosting the database to receive the performance benefits of executing analytics using the in-memory database. Exposed and accessible APIs may be used for communicating data with independently created analytics modules, which, because of the APIs, may be seamlessly plugged-into or otherwise integrated with the in-memory database. Validation of data may be available to determine whether the new modules conform to expectations of the API.

In one embodiment, an in-memory database system comprises one or more storage nodes comprising a non-transitory machine-readable storage media storing one or more records of a database, wherein the storage media of each respective storage node is a main memory of the respective storage node; an analytics agent nodes comprising a processor executing an analytics module using a set of query results as input parameters responsive to receiving a request for analytics indicating the analytics module, wherein the set of query results contains binary data representing one or more records retrieved from the one or more storage nodes storing the one or more records; and an analytics module datastore comprising non-transitory machine-readable storage media storing one or more analytics modules, and a processor configured to transmit a new analytics module to one or more analytics agent nodes.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

As used herein, the following terms have the following definitions:

"Node" refers to a computer hardware configuration suitable for running one or more modules.

"Cluster" refers to a set of one or more nodes.

"Module" refers to a computer software component suitable for carrying out one or more defined tasks. Modules used within the disclosed system may include any software implementation of analytical methods for processing any kind of data.

"Collection" refers to a discrete set of records.

"Record" refers to one or more pieces of information that may be handled as a unit.

"Field" refers to one data element within a record.

"Partition" refers to an arbitrarily delimited portion of records of a collection.

"Schema" refers to data describing one or more characteristics one or more records.

"Search Manager" refers to a module configured to at least receive one or more queries and return one or more search results.

"Analytics Module" refers to a module configured to at least receive one or more records, process said one or more records using one or more analytics methods, and return the resulting one or more processed records.

"Analytical Method" refers to any operation that may be applied to an aggregate of search results.

"Analytics Agent" refers to nodes storing and executing one or more analytics modules.

"Analytics Parameters" refers to parameters that describe the operation that an analytic module may have to perform in order to get specific results.

"Search Conductor" refers to a module configured to at least run one or more queries on a partition and return the search results to one or more search managers.

"Node Manager" refers to a module configured to at least perform one or more commands on a node and communicate with one or more supervisors.

"Supervisor" refers to a module configured to at least communicate with one or more components of a system and determine one or more statuses.

"Heartbeat" refers to a signal communicating at least one or more statuses to one or more supervisors.

"Partitioner" refers to a module configured to at least divide one or more collections into one or more partitions.

"Dependency Manager" refers to a module configured to at least include one or more dependency trees associated with one or more modules, partitions, or suitable combinations, in a system; to at least receive a request for information relating to any one or more suitable portions of said one or more dependency trees; and to at least return one or more configurations derived from said portions.

"Database" refers to any system including any combination of clusters and modules suitable for storing one or more collections and suitable to process one or more queries.

"Query" refers to a request to retrieve information from one or more suitable partitions or databases.

"Memory" refers to any hardware component suitable for storing information and retrieving said information at a sufficiently high speed.

"Application Programming Interface," or "API" allows different user-developed software modules to be compatible with the components (e.g., software modules, nodes) of the distributed computing system.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

An in-memory database is a database storing data in records controlled by a database management system (DBMS) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

The present disclosure describes an in-memory database including one or more clusters and one or more modules, where suitable modules may include one or more of a search manager, an analytics agent, a node manager, a search conductor, a supervisor, a dependency manager, and/or a partitioner. The disclosed system architecture allows the implementation of customized pluggable in-memory analytics modules that may be dynamically embedded into one or more analytics agents or search conductors.

In one or more embodiments nodes, modules, or suitable combinations in the system may be linked to one or more supervisors, where said nodes, modules, or suitable combinations may be configured to send heartbeats to said supervisors. Said supervisors may be linked to one or more dependency managers including one or more dependency trees for one or more modules, partitions, or suitable combinations thereof. Supervisors may additionally be linked to one or more other supervisors, where additional supervisors may be linked to other components in the system.

System Configuration

System Architecture

Figure 1:
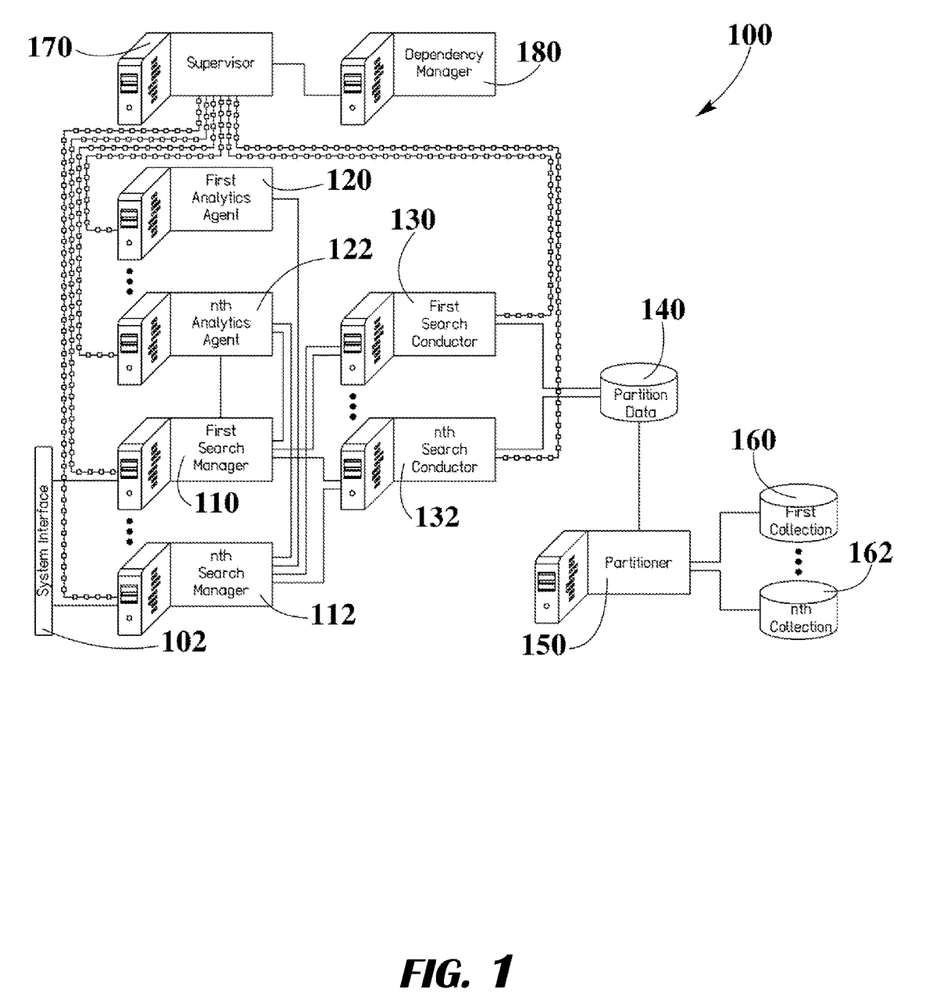
FIG. 1 shows an in-memory database architecture, according to an embodiment.

FIG. 1 shows system architecture 100 having system interface 102, first search manager 110, nth search manager 112, first analytics agent 120, nth analytics agent 122, first search conductor 130, nth search conductor 132, partition data 140, partitioner 150, first collection 160, nth collection 162, supervisor 170, and dependency manager 180.

In one or more embodiments, system interface 102 may feed one or more queries generated outside system architecture 100 to one or more search managers 110, 112 in a first cluster including at least one node including a first search manager 110 and up to n nodes including an nth search manager 112. The one or more search managers 110, 112 in said first cluster may be linked to one or more analytics agents 120, 122 in a second cluster including at least a first analytics agent 120 and up to nth analytics agent 122.

Search managers 110, 112 in the first cluster may be linked to one or more search conductors 130, 132 in a third cluster. The third cluster may include at least a first search conductor 130 and up to an nth search conductor 132. Each search node (i.e., node executing search manager 110, 112) may include any suitable number of search conductors 130, 132.

Search conductors 130, 132 in the third cluster may be linked to one or more database nodes storing partition data 140. Partition data 140 may include one or more partitions (i.e., arbitrarily delimited portions of records partitioned from a discrete set of records) generated by a node executing one or more partitioners 150, which may be a module configured to at least divide one or more collections into one or more partitions. Each of the partitions may correspond to at least a first collection 160 and up to nth collection 162. The collections 160, 162 may additionally be described by one or more schemata, which may define the data in the collections 160, 162. The one or more schemata may include information about the name of the fields in records of the partitions, whether said fields are indexed, what compression method was used, and what scoring algorithm is the default for the fields, amongst others. The schemata may be used by partitioners 150 when partitioning the first collection 160 and up to nth collection 162, and may be additionally be used by the first search manager 110 and up nth search manager 112 when executing one or more queries on the collections.

One or more nodes may execute a supervisor 170 software module that receives a heartbeat signal transmitted from other nodes of the system 100. A supervisor 170 may be configured to receive data from nodes of the system 100 that execute one or more dependency manager 180 software modules. A dependency manager 180 node may store, update, and reference dependency trees associated with one or more modules, partitions, or suitable combinations thereof, which may indicate configuration dependencies for nodes, modules, and partitions, based on relative relationships. A supervisor 170 may additionally be linked to other nodes in the system 100 executing one or more other supervisors 170. In some cases, links to additional supervisors 170 may cross between clusters of the system architecture 100.

Nodes executing an analytics agent 120,122 may execute one or more suitable analytics modules, which conform to a specified application programming interface (API) that facilitates interoperability and data transfer between the components of the system (e.g., software modules, nodes). Analytics agents 120, 122 may be configured to process aggregated query results returned from search conductors 130, 132. For example, a search manager 110 may receive a search query and then generate search conductor queries, which the search manager 110 issues to one or more search conductors 130, 132. After the search conductors 130, 132 execute their respectively assigned search conductor queries, the search manager 110 will receive a set of aggregated query results from the one or more search conductors 130, 132. The search manager 110 may forward these search query results to an analytics agent 120 for further processing, if further processing is required by the parameters of the search query.

In some implementations, after a search manager 110 determines the search query has requested for an analytics agent 120 to process one or more sets of aggregated results received from the search conductors 130, 132, the search manager 110 may transmit a database schema file and/or one or more analytical parameters to the analytics agents 120, 122. In some cases, the search query may request particular analytics algorithms to be performed, which the search manager 110 may use to identify which analytics agent 120 should receive aggregated search results. In some cases, one or more of the sets of aggregated results may be transmitted to the analytics agents 120, 122 in the form of compressed records, which contain data compressed according to a compression algorithm. In some cases, data of the records may be compressed at the fields of the records; and in some cases, full records may be compressed.

Nodes executing analytics agents 120, 122 having various analytics modules. Non-limiting examples may include: disambiguation modules, linking modules, and link on-the-fly modules, among other suitable modules and algorithms. Suitable modules may include any software implementation of analytical methods for processing any kind of data. In some embodiments, particular analytics modules or analytics agents 120, 122 may be accessible only to predetermined instances, clusters, partitions, or/or instantiated objects of an in-memory database.

Analytics Modules

According to an embodiment, a plurality of analytics modules may be created that conform to an application programming interface (API) defined for pluggable analytics in an in-memory database. The disclosed system architecture may allow the addition of multiple customized analytics modules executed by analytics agents of the system, which may be added to the system architecture, without interrupting operation or services, which may support dynamic processing of constant streams of data.

Newly created analytics modules may be plugged into the database using simple module set up processes and may enable the application in real time to apply one or more analytical methods to aggregated results lists, without having to change how the data is managed, prepared and stored.

Separate APIs may be constructed to support models which score records against queries, typically a search conductor function, or to perform closure or other aggregate analytical function on a record set, typically an analytics agent task.

Figure 2:
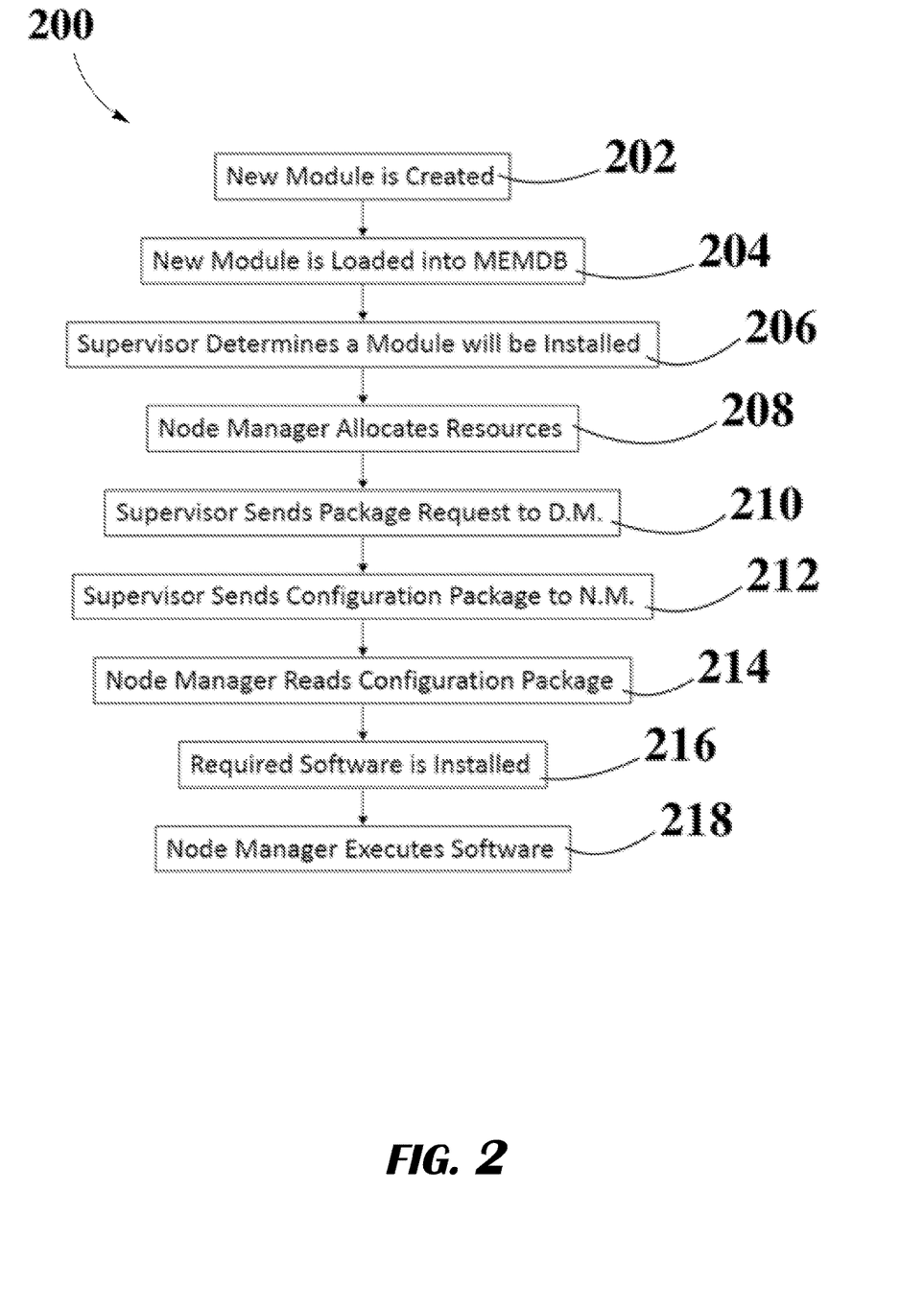
FIG. 2 is a flowchart of a method for adding new modules to an in-memory database, according to an embodiment.

FIG. 2 is a flowchart of a method for adding analytics modules 200 to a system hosting an in-memory database having steps 202, 204, 206, 208, 210, 212, 214, 216 and 218, according to an embodiment.

In step 202, one or more suitable analytics modules may be created that conform to a suitable API for pluggable analytics in an in-memory database. The API may have required methods that the analytics module must implement to provide system interoperability. Analytics modules may be created to satisfy user specific needs.

One or more analytics modules may be stored in a suitable module store. The module store is a non-transitory machine-readable storage medium that may be managed by a supervisor. Depending upon the embodiment, an entity, developer, user, component, module, external source, and/or other source responsible for building and/or managing analytics modules, may develop the analytics module using one or more suitable programming languages.

According to some embodiments, an API may serve as a software-to-software interface that may include sets of source code programming instructions and standards for a computer to compile and/or implement, such as parameters or arguments for routines, data structures, object classes, and variables. The APIs may allow the system to accept data inputs from, and output results to, later-developed software modules, while remaining agnostic to ownership, capabilities, or other characteristics of the later-developed modules, as long as the data inputs conform to the data formats (i.e., expected arguments). Some software routines of the system APIs responsible for data input and output may be "exposed" to such newly-developed or later-developed, and often external, software modules. Exposed APIs may validate data acceptability when the exposed APIs receive, fetch, or otherwise "consume" data from the software modules. Authoring software source satisfying the expected arguments of the system APIs may allow developers and other users to develop a variety of software modules, such as analytics modules, to communicate (i.e., transmit, receive) data with the nodes and modules of the system, such as the analytics agents.

Analytics agents may include one or more nodes within the system hosting the in-memory database, where each analytics agents' node may be able to store and execute one or more analytics modules. APIs may allow different user-developed analytics modules to be compatible with the various nodes and modules of the system and the in-memory database.

In some embodiments, one or more modules may be external modules developed by third parties using any suitable programing language compatible with the APIs available. In such embodiments, these newly developed modules may be stored in the analytics module store.

In step 204, the created module may be loaded into the in-memory database by adding the corresponding definition and any dependencies into the dependency manager, which may be accomplished using any suitable automated or manual processes capable of deploying, uploading, or otherwise storing, the appropriate files and instructions onto the dependency manager.

In step 206, the supervisor determines, based on module settings in the dependency manager, if one or more modules are to be installed on one or more nodes. In some circumstances, module settings stored in the dependency manager will include whether a loaded analytic module is "enabled" or "disabled." For example, if the settings indicate an analytics module is enabled, then the analytics module may be deployed to each respective node running the analytics agents performing that analytics module. A supervisor then sends installation preparation instructions to one or more node managers on said one or more nodes.

In step 208, the node manager allocates the node's resources, based on module settings in the dependency manager, for running the one or more desired modules. In one or more embodiments, the allocation of resources may expire after a period of time should the supervisor discontinue the process. The module settings in the dependency manger will indicate how much memory, CPU and/or disk are required by the module.

In step 210, the supervisor sends a request to a dependency manager for one or more configuration packages associated with the one or more modules to be installed on the node. As an example, automated or manual processes (e.g., system administrator) may have added a new module to the dependency manager, which may also define any dependencies corresponding to configuration packages, such as other software or metadata.

In step 212, the supervisor may then send the configuration package to the node manager.

In step 214, the node manager reads any software and data required to run the one or more modules, as defined in the dependency manager.

In step 216, the node manager installs the required software and data fetched in step 214. Analytics Agents may dynamically load and unload modules once they are installed, so there may not be a need to restart any equipment or software and the installed one or more modules may be ready to be used.

In step 218, the node manager executes the software installed in step 216. After the analytics agent starts the analytics module, each analytics agent running the new module may transmit a heartbeat signal to a supervisor. The heartbeat signals may indicate the new module was properly started and is ready to use.

Example #1 is a system hosting an in-memory database, similar to the one described in FIG. 1. In this example, the in-memory database and system includes a plurality of analytics modules. One analytics module may implement record linking utilizing a weighted model while another uses decision trees. Some modules may be optimized to operate on any available data, while others are tuned to produce desired results from a restricted set of fields or data collections. Some modules were developed and uploaded by different user groups. Each user query can specify different analytics modules be applied and use different parameters for said modules. It is possible for different users to use the in-memory database to extract information at the same time and even process the same data in several different ways at the same time. It is also possible for some users to plug-in new analytics modules at any time, without affecting the performance of the in-memory database or the experience of other users.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An in-memory database system comprising:
one or more storage nodes comprising a non-transitory machine-readable storage media storing one or more records of an in-memory database, wherein the storage media of each respective storage node is a main memory of the respective storage node;
one or more analytics agent nodes comprising a processor executing an analytics module using a set of query results as input parameters responsive to receiving a request for analytics indicating the analytics module, wherein the set of query results contains binary data representing one or more records retrieved from the one or more storage nodes storing the one or more records; and
an analytics module datastore comprising a non-transitory machine-readable storage media storing one or more analytics modules, and a processor transmitting a new analytics module to the one or more analytics agent nodes,
wherein the one or more analytics agent nodes are in communication with one or more supervisor nodes, and wherein, upon the one or more analytics agent nodes receiving the new analytics module from a client computer, the one or more analytics agent nodes transmit a heartbeat signal to the one or more supervisor nodes automatically, the heartbeat signal indicating the one or more analytics agent nodes received the new analytics module, and
wherein each of the one or more storage nodes, the one or more analytics agent nodes, and the one or more supervisor nodes is a distinct node.

2. The system according to claim 1, further comprising a search manager node comprising a processor transmitting the set of query results to the one or more analytics agent nodes responsive to determining if a search query contains the request for analytics.

3. The system according to claim 2, wherein the search manager node identifies the one or more analytics agent nodes prior to transmitting the search query to a search conductor node.

4. The system according to claim 3, wherein the search manager node determines one or more analytics parameters to be applied prior to transmitting the search query to the search conductor node.

5. The system according to claim 2, wherein, responsive to the search manager determining if the search query contains the request for analytics: identifying the one or more analytics agent nodes executing the analytics module indicated by the request for analytics.

6. The system according to claim 5, further comprising a search conductor node comprising a processor executing a search conductor query and transmitting a subset of query results containing one or more records of a storage node satisfying the search conductor query, in response to receiving the search conductor query from the search manager node, wherein the search manager node generates one or more search conductor queries according to the search query, and wherein the search manager transmits each respective search conductor query to each respective search conductor node.

7. The system according to claim 6, wherein the search manager node aggregates each of the respective subsets of query results received from the respective search conductors, thereby generating the set of query results.

8. The system according to claim 1, wherein the search manager node transmits to the analytics agent at least one record in the set of query results is compressed according to a binary data compression algorithm.

9. The system according to claim 1, wherein the analytics module is selected from the group consisting of: a disambiguation module, a linking module, a scoring module, and a link on-the-fly module.

10. The system according to claim 1, further comprising a system interface node comprising a processor transmitting a new analytics module to the analytics module store responsive to receiving the new analytics module from a client computer.

11. The system according to claim 1, further comprising a system interface node comprising a processor validating data of the search query in accordance with one or more application programming interfaces.

12. The system according to claim 1, further comprising a system interface node storing the new analytics module in one or more analytics agents and generating one or more new analytics modules based on an application programming interface.

13. The system according to claim 1, further comprising a client computer comprising a processor transmitting one or more search queries to the search manager.

14. The system according to claim 1, further comprising the one or more supervisor nodes comprising a processor transmitting a new analytics module from the analytics module store to a new analytics agent according to a dependency tree associated with the new analytics agent stored in a dependency manager node.

* * * * *